United States Patent
Freedman

(10) Patent No.: US 8,073,813 B2
(45) Date of Patent: Dec. 6, 2011

(54) REFRESH AND FILTER ANCHORS

(75) Inventor: Gordon J. Freedman, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 555 days.

(21) Appl. No.: 12/207,331

(22) Filed: Sep. 9, 2008

(65) Prior Publication Data
US 2009/0307279 A1    Dec. 10, 2009

Related U.S. Application Data

(60) Provisional application No. 61/059,657, filed on Jun. 6, 2008.

(51) Int. Cl.
*G06F 17/00* (2006.01)
(52) U.S. Cl. .................. 707/620; 707/610; 707/621
(58) Field of Classification Search .................. 707/610, 707/620, 621
See application file for complete search history.

(56) References Cited

U.S. PATENT DOCUMENTS

| | | | |
|---|---|---|---|
| 6,466,951 B1 | 10/2002 | Birkler et al. | |
| 7,660,831 B2 * | 2/2010 | Freedman | 707/621 |
| 7,693,832 B2 | 4/2010 | Vargas et al. | |
| 7,761,414 B2 * | 7/2010 | Freedman | 707/610 |
| 7,778,971 B2 * | 8/2010 | Freedman et al. | 707/620 |
| 2008/0162728 A1 | 7/2008 | Robeal et al. | |
| 2008/0168072 A1 | 7/2008 | Freedman | |
| 2008/0168106 A1 | 7/2008 | Freedman | |
| 2009/0307375 A1 | 12/2009 | Mccarthy | |

* cited by examiner

*Primary Examiner* — Sana Al-Hashemi
(74) *Attorney, Agent, or Firm* — Blakely, Sokoloff, Taylor & Zafman LLP

(57) ABSTRACT

Structured data on a device is synchronized with structured data on a host if the device and the host have a matching refresh anchor. Structured data on the device is additively synchronized with structured data on the host if the device and the host have different refresh anchors. Additive synchronization combines structured data from the device with structured data on the host without deleting structured data from the device or the host.

18 Claims, 7 Drawing Sheets

REFRESH AND FILTER ANCHORS

This Non-Provisional Application claims priority to U.S. Provisional Patent Application No. 61/059,657, entitled Refresh and Filter Anchors, filed on Jun. 6, 2008.

FIELD

Embodiments of the invention relate to data synchronization, and more particularly to synchronizing data between multiple processing systems (e.g., multiple desktop computer systems and a handheld device).

BACKGROUND

Handheld computer devices typically allow a user to synchronize data between the handheld computer device and another computer, such as a user's desktop computer. This type of synchronization allows both computers to maintain the same set of information, such as the same calendar, thereby allowing the user to view his/her calendar on either the desktop computer or the handheld computer device. The synchronization is typically performed by coupling together the host computer with a handheld computer through a mechanical and electrical connection provided by a dock, though synchronization can also be performed wirelessly (e.g., over-the-air (OTA) synchronization). However, synchronization between more than two computers (e.g., multiple desktop computers and a handheld computer device) presents added challenges.

Two synchronizing computers might exchange one or more identifiers after a successful synchronization in order to save the synchronization state between the two computers. During future synchronizations, the synchronization states of the two computers can be compared. This comparison facilitates faster synchronization as well as data integrity during synchronization. However, existing synchronization techniques are insufficient for synchronizing data between a handheld computer device and multiple desktop computers (e.g., a home computer and a work computer). More specifically, existing synchronization techniques can be the source of data loss and other synchronization errors when more than two computers are involved.

Furthermore, various synchronization applications allow a user to apply filters during synchronization. For example, a user may set a filter that causes only work-related contact information to be synchronized between a handheld computer device and a desktop computer at work. However, in a scenario where a handheld computer device is synchronized with two different computers (e.g., a home computer and a work computer), differing filter settings on the different computers can be a further source of data loss and other synchronization errors.

SUMMARY OF THE INVENTION

Refresh anchors and filter anchors are used to maintain synchronization between multiple computers. Structured data on a device is synchronized with structured data on a first host if the device and the first host have a matching refresh anchor. Structured data on the device is additively synchronized with structured data on the host if the device and the host have different refresh anchors. Additive synchronization combines structured data from the device with structured data on the host without deleting structured data from the device or the host.

When the device attempts to synchronize with a second host, refresh anchors on the device and the second host are compared. Assuming that the refresh anchor on the device does not match the refresh anchor on the second host, structured data on the device is additively synchronized with structured data on the second host. Non-matching refresh anchors between the device and a host may indicate that the device was either reset from a different host or the device was restored from a backup. Resetting a device or restoring a device from backup can significantly alter the structured data stored on the device. By performing additive synchronization (where data is added but not deleted), data integrity is preserved when synchronizing a device with multiple computers.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

Figure 1:
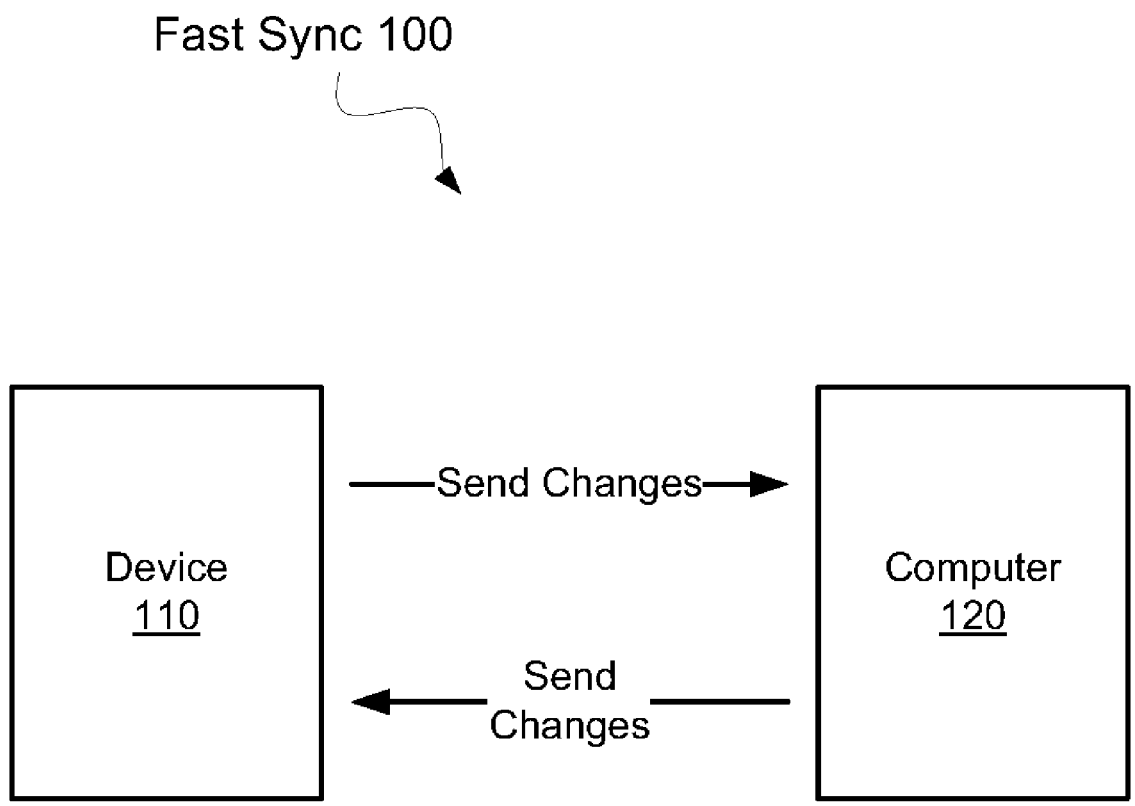
FIG. 1 is a block diagram illustrating a fast sync according to various embodiments.

As provided herein, methods, apparatuses, and systems enable synchronization of multiple computers and/or computing devices. Though any combination of handheld computing devices, desktop computers and/or servers could be used in a single synchronization process, examples of synchronization used herein may simply refer to a device synchronizing with a computer in order to facilitate ease and clarity of description. With respect to synchronizing a device with multiple computers, the multiple computers could be different user profiles and/or accounts maintained on the same computer in some embodiments. The data involved in synchronization includes structured data, such as calendar items, contact information, email account setup information, bookmarks, notes, task lists, music files, documents, and/or other files. Thus, structured data, as used herein, refers to data on a device or computer that is synchronized during a synchronization procedure.

Fast synchronization, as used herein, pushes (or pulls) only device changes to a synchronizing computer. Slow synchronization, as used herein, pushes (or pulls) all structured data on a device to a synchronizing computer. The synchronizing computer subsequently compares the device data with the previous state of all data synced from the device to determine the changes that have been made since the last successful synchronization.

The term "refresh" synchronization, as used herein, is similar to a slow synchronization in that all structured data (i.e., not just changes) are sent to the synchronizing computer. However, a refresh synchronization starts from the premise that the device and the computer have never synced with each other before (even though the device and the computer may have actually synced before). Thus, a refresh sync is like an initial synchronization where the synchronization is additive. In other words, matching structured data on both the device and computer is not duplicated but neither is structured data deleted from either the device or the computer. For example, if the device contained structured data A, B and C while the computer contained structured data B, C, and D, a refresh synchronization between the device and the computer would yield a single copy of A, B, C and D on the device and the computer.

For records from the device that appear to be the same as records on the computer during a refresh sync (based on "identity matching" of certain properties indicated in the schema for the particular dataclass), but where the records differ in other non-identity properties, the records are merged. Conflicts are shown to the user for these records so they can choose between the two options (for example, if both the device and computer have a record A which is a contact named "John Smith", and each has a different value for the Note property, the device's record will match the computer record and the user will see a conflict on the note field).

Normal synchronization anchors dictate whether to perform a fast sync or a slow sync between a device and a computer. For example, the device might store its own device anchor and a copy of the previous computer anchor from the last successful synchronization. Similarly, the computer might store its own computer anchor and a copy of the previous device anchor from the last successful synchronization. Thus, when the device and the computer begin a synchronization process, they can compare device and computer anchors. If the synchronization anchors match, a fast sync may be performed. If the synchronization anchors do not match, a slow sync may be performed to accurately reconcile the structured data between the two devices. Upon successful synchronization, the device and the computer may store new device and computer anchors, respectively, to memorialize the successful synchronization.

Fast and slow synchronizations cause structured data to be added and deleted based on detected changes since the last successful synchronization between a device and a computer (e.g., a home computer). Thus, synchronizing the device with a different computer (e.g., a work computer) in-between synchronization with the original computer can cause structured data to be lost or erroneously altered. In particular, resetting the device from a different computer or restoring the device from a backup on a different computer can cause structured data to be lost or erroneously altered in subsequent synchronizations with the original computer.

Various embodiments described herein employ the use of refresh anchors to handle device synchronization with multiple computers (e.g., a home computer and a work computer). A refresh anchor may be a unique identification (ID) that is shared across multiple synchronizing devices and/or computers. If a device and a computer have matching refresh anchors, then normal sync operations (e.g., fast sync, slow sync, etc.) can proceed. If, however, refresh anchors are not matching (or do not exist), then the device and the computer perform an additive refresh synchronization.

Various embodiments of refresh anchors may be summarized, as follows:

1) If a device and a computer have different refresh anchors, a refresh synchronization will be performed and the computer will subsequently store the device's refresh anchor(s);
2) If the device is restored from a backup, refresh anchors are set to a new unique value to cause all computers to perform a refresh synchronization;
3) If a computer resets a dataclass for the device (e.g., replaces all structured data on the device for a specific dataclass such as contacts, calendar items, etc.), the computer creates a new refresh anchor which is set on the device (and saved on the computer) to cause other computers to perform a refresh synchronization.

Additionally, various embodiments may employ the use of filter anchors to handle device synchronization with multiple computers. Specifically, different computers might have different synchronization filter settings (e.g., personal contacts might be filtered out by one computer while work-related contacts are filtered out on another computer). These different filter settings can create unexpected or undesirable sync results when syncing a device with multiple computers. Similar to refresh anchors, a filter anchor may be a unique ID that is shared across multiple synchronizing devices and/or computers. If a device and a computer have matching filter anchors, then normal sync operations may proceed. If, however, filter anchors are not matching (or do not exist), then the device and the computer perform an additive refresh synchronization.

FIG. 1 is a block diagram illustrating an example of a fast synchronization between device 110 and computer 120. Devices described and illustrated in the figures herein, such as device 110, can be any type of handheld computer device capable of synchronization with another computer. One example of a handheld computer device is the iPhone, available from Apple, Inc. of Cupertino, Calif. Computers discussed herein, such as computer 120, can be any type of computer capable of synchronization with another computer or computer device. For example, computer 120 could be a client such as a desktop computer or it could be a central synchronization server.

As shown, fast sync 100 involves device 110 sending its changes to computer 120. Changes may include any changes to structured data that have occurred since the last successful synchronization with computer 120, including additions, deletions, and/or modifications. Changes can be pushed to computer 120 (or pulled from device 110, depending on semantics) in any number of ways, including wirelessly (e.g., over-the-air (OTA)) or via a docking station connected to computer 120 via a cable.

Computer 120 also sends its changes back to device 110. For example, if the user of device 110 added a new calendar item since the last successful sync, that change would be sent to computer 120. Similarly, if the user deleted an outdated phone number for a contact on computer 120, that change would be sent to device 110.

Figure 2:
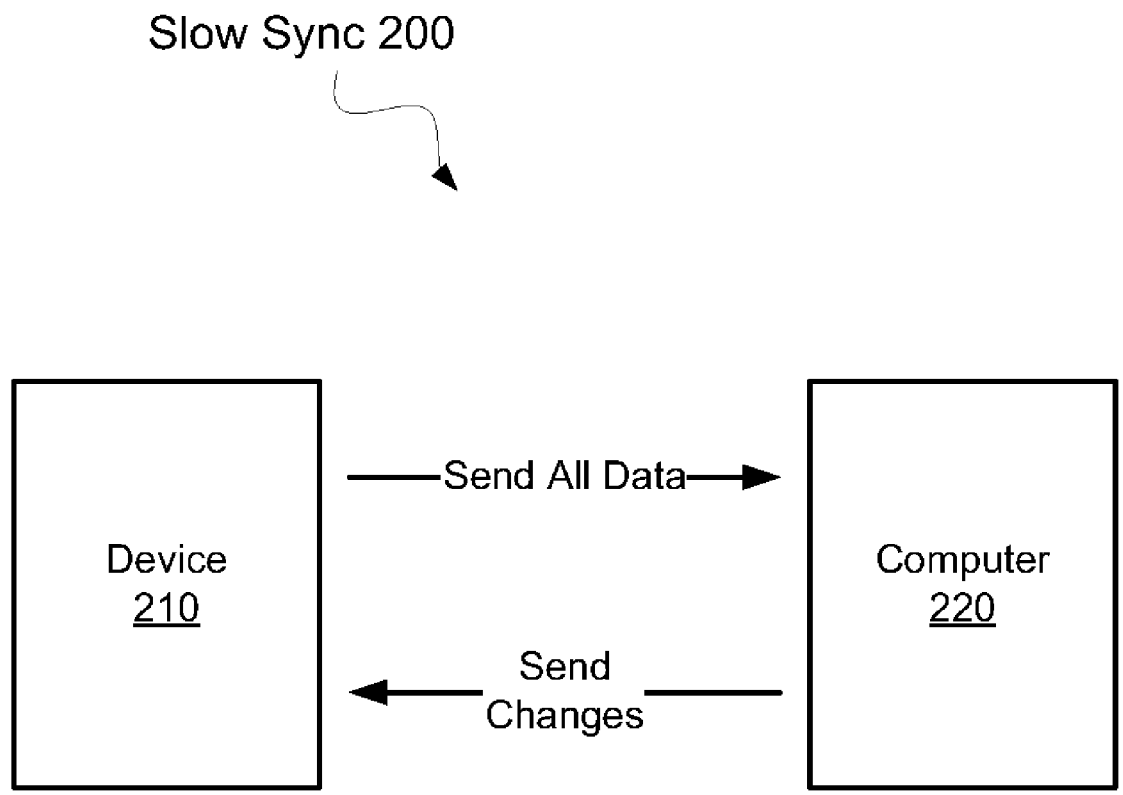
FIG. 2 is a block diagram illustrating a slow sync according to various embodiments.

FIG. 2 is a block diagram illustrating an example of a slow synchronization between device 210 and computer 220. As shown, slow sync 200 involves device 210 sending all structured data to computer 220. In some embodiments, sending "all" structured data is not necessarily absolute. In other words, something less than all structured data (but more than simply changes to structured data) could be sent. The structured data can be pushed to computer 220 (or pulled from device 210, depending on semantics) in any number of ways, including wirelessly (e.g., over-the-air (OTA)) or via a docking station connected to computer 220 via a cable.

Computer 220 compares the structured data received from device 210 with its own version of the structured data associated with device 210. Based on the comparison, computer 220 determines any changes that have been made. Computer 220 updates itself with the changes and also sends the changes back to device 210, which is updated accordingly. Changes may include any changes to structured data that have occurred since the last successful synchronization with computer 220, including additions, deletions, and/or modifications.

Figure 3:
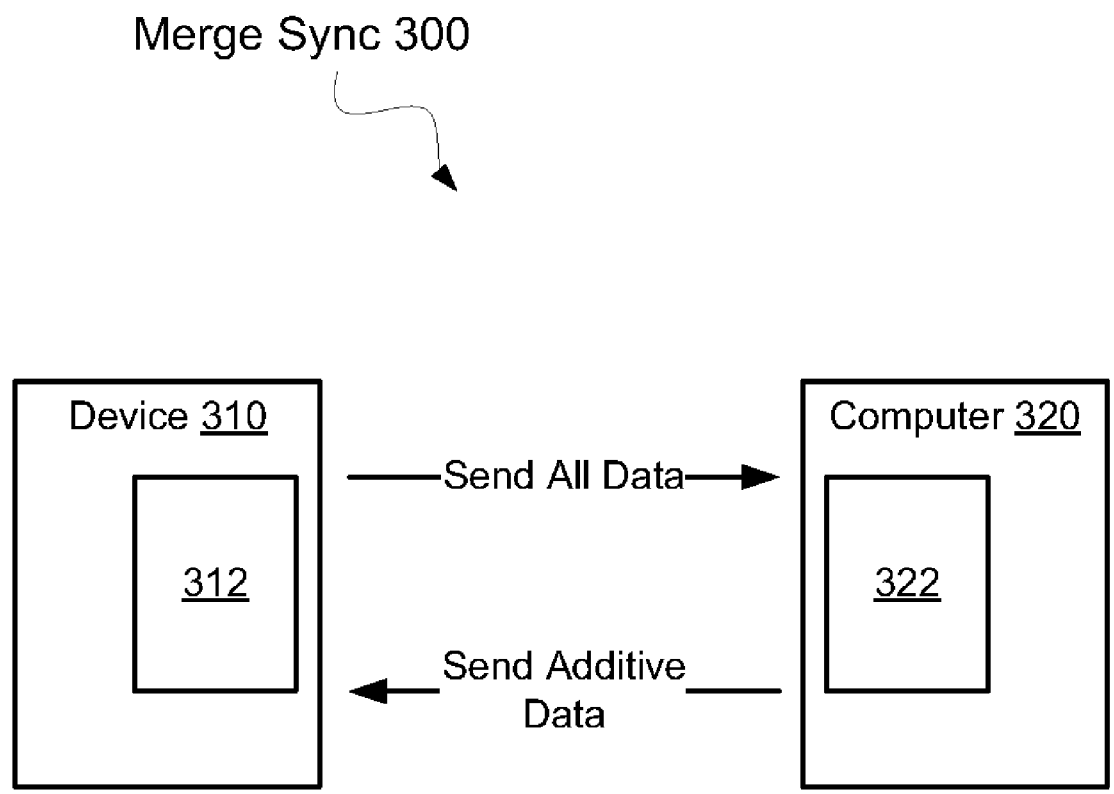
FIG. 3 is a block diagram illustrating an additive or merge sync according to various embodiments.

FIG. 3 is a block diagram illustrating an example of a refresh (or merge) synchronization between device 310 and computer 320. Similar to the slow sync of FIG. 2, refresh sync 300 involves device 310 sending all structured data to computer 320. Again, in some embodiments, sending "all" structured data is not necessarily absolute. In other words, something less than all structured data (but more than just changes to structured data) could be sent. The structured data can be pushed to computer 320 (or pulled from device 310, depending on semantics) in any number of ways, including wirelessly (e.g., over-the-air (OTA)) or via a docking station connected to computer 320 via a cable.

Both device 310 and computer 320 have synchronizing components 312 and 322, respectively. These components can be any type of component (hardware, firmware, software, other combination, etc.) that carries out the synchronization functions of embodiments described herein. The devices/computers in FIGS. 1 and 2 may have the same or similar components.

Computer 320 compares the structured data received from device 310 with its own version of the structured data associated with device 310. Based on the comparison, computer 320 determines any changes that have been made. In this refresh sync 300, computer 320 only updates itself with the additive changes received from device 310. Computer 320 also sends additive changes back to device 310, which is updated accordingly. In other words, no structured data is deleted during a refresh synchronization, preventing unexpected/unwanted data loss. For example, if device 310 contains structured data A, B and C and the computer contains structured data B, C, and D, a refresh synchronization between the device and the computer would be additive, yielding a single copy of A, B, C and D on the device and the computer.

Figure 4:
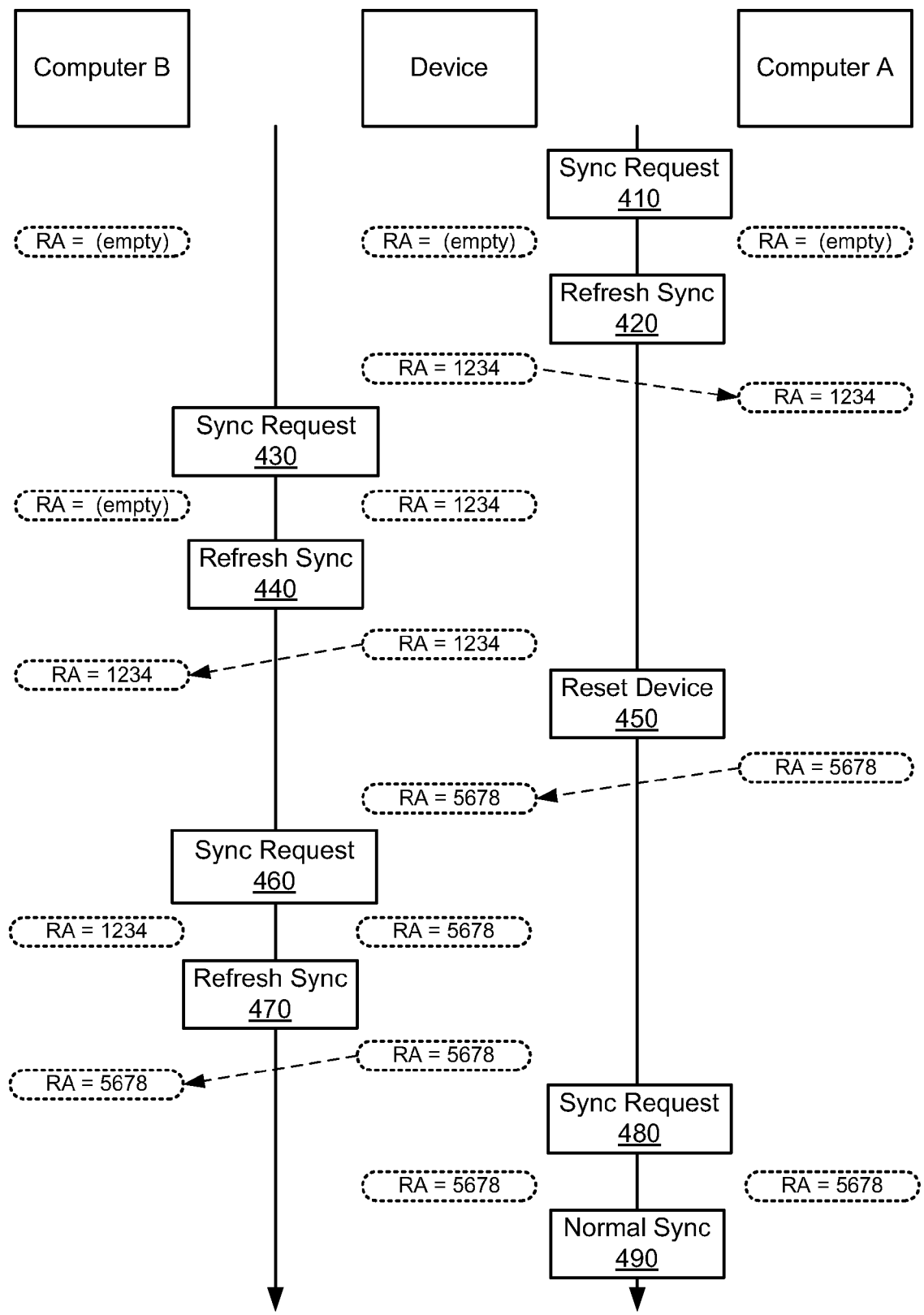
FIG. 4 is a block/flow diagram illustrating synchronization with multiple computers according to various embodiments.

FIG. 4 is a block/flow diagram illustrating synchronization with multiple computers. The flow of events illustrated in FIG. 4 is merely an example used to facilitate description of various aspects of various embodiments. While some events described in the flow may be an intended consequence of previous events in the flow, the overall flow of events should not be interpreted as a strict ordering of steps in a process.

Devices and computers used in various embodiments employ the use of refresh anchors. When a sync request 410 is initiated between the device and computer A, the refresh anchor (RA) of the device is compared with the refresh anchor of computer A. When the device and/or computer A has an empty refresh anchor, as shown, it may signify that this is an initial synchronization between the device and computer A. Regardless, empty refresh anchors and/or non-matching refresh anchors trigger a refresh synchronization 420.

In conjunction with a successful refresh synchronization, a new refresh anchor is generated. In some embodiments, multiple refresh anchors could be generated. As shown, the device generates the refresh anchor "1234" and sends a copy of the refresh anchor to computer A. In other embodiments, computer A could generate the new refresh anchor and send a copy to the device.

After synchronizing with computer A, a user of the device may attempt to synchronize the device with computer B. A sync request 430 is generated between the device and computer B, causing the refresh anchors on the device and on computer B to be compared. As shown, the refresh anchor on computer B is empty and also does not match the refresh anchor ("1234") of the device. As a result, a refresh sync 440 is performed between the device and computer B. In conjunction with a successful synchronization, the device sends a copy of its refresh anchor ("1234") to computer B. Thus, at this point, computer A, computer B, and the device all have the same refresh anchor.

When computer A resets some or all structured data on the device 450, computer A generates a new refresh anchor that is set on the device (and stored on computer A). By creating a new refresh anchor, a subsequent synchronization request 460 between the device and computer B will necessarily be an additive refresh sync 470 because the refresh anchors on the device and computer B will be non-matching. As discussed previously, the refresh sync will prevent unnecessary/unwanted data deletion on computer B based on the changes from resetting the device. As shown in FIG. 4, in conjunction with refresh sync 470, the device sends a copy of its refresh anchor ("5678") to computer B.

Given that the device and computer A still have the same refresh anchors despite the refresh sync 470 with computer B, a subsequent sync request 480 between the device and computer A yields normal sync 490 (e.g., fast sync or slow sync, etc.).

Filter anchors operate in much the same way as the refresh anchors described herein (e.g., FIG. 4). When a sync request occurs, filter anchors are compared. If the filter anchors on the device and the computer are not equal, then a refresh synchronization is performed. In conjunction with a successful synchronization, filter settings on the device and the synchronizing computer are reconciled. The options for reconciling the filter settings in various embodiments include, but are not limited to, the following:

1) Impose the filter settings of the synchronizing computer onto the device;
2) Impose the filter settings of the device onto the synchronizing computer;
3) Ask the user whether to use the filter settings of the last synchronizing computer, the current synchronizing computer, the device, or some combination of new and/or existing filter settings.

Filter settings are known in the art and are not discussed in detail herein. Examples of filter settings might include (but are not limited to) things like "only sync contacts with phone numbers", or "only sync contacts in the indicated groups X, Y, Z."

Figure 5:
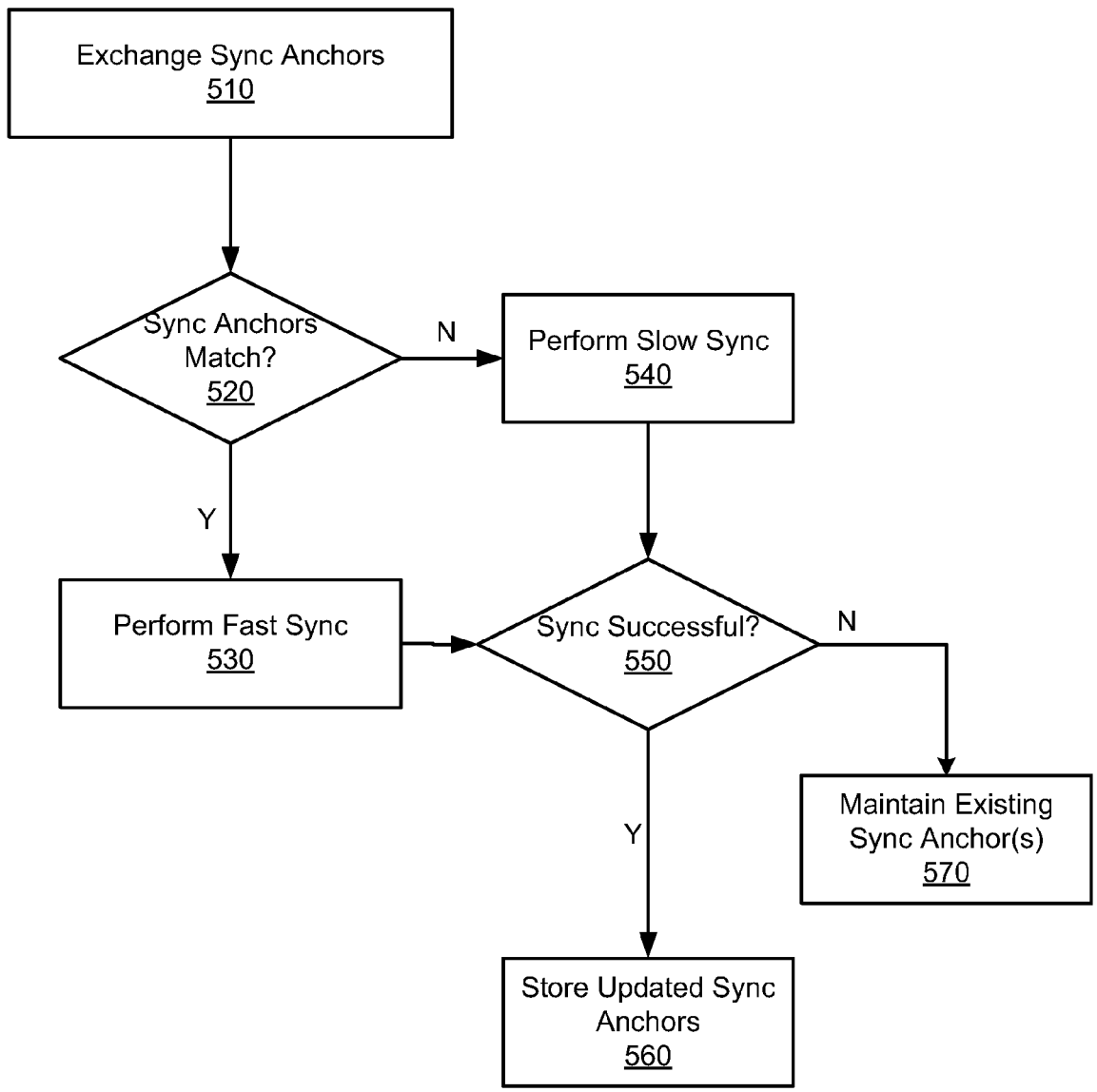
FIG. 5 is a flow diagram illustrating a prior art synchronization process.

FIG. 5 is a flow diagram illustrating a prior art synchronization process. When a device and a computer, for example, connect to initiate synchronization, the device and the computer exchange synchronization anchors 510. It is determined whether the synchronization anchors on the device and the computer are matching 520. If the synchronization anchors are matching, then a fast synchronization (e.g., device sends only changes that have occurred since the last synchronization) is performed 530. If the synchronization anchors are not matching, then a slow or "complete" synchronization is performed 540.

It is subsequently determined whether the synchronization was successful 550. If the synchronization is successful, then new and/or updated synchronization anchors are stored on both the device and the syncing computer 560. These synchronization anchors mark the common state of the device and the computer immediately after synchronization. In this way, matching synchronization anchors in subsequent synchronization attempts allow for a fast synchronization to occur because the common state of the device and the computer since the last synchronization is known. If a synchronization attempt is ultimately unsuccessful, then the existing synchronization anchors are maintained 570 (i.e., new synchronization anchors are not stored).

Figure 6:
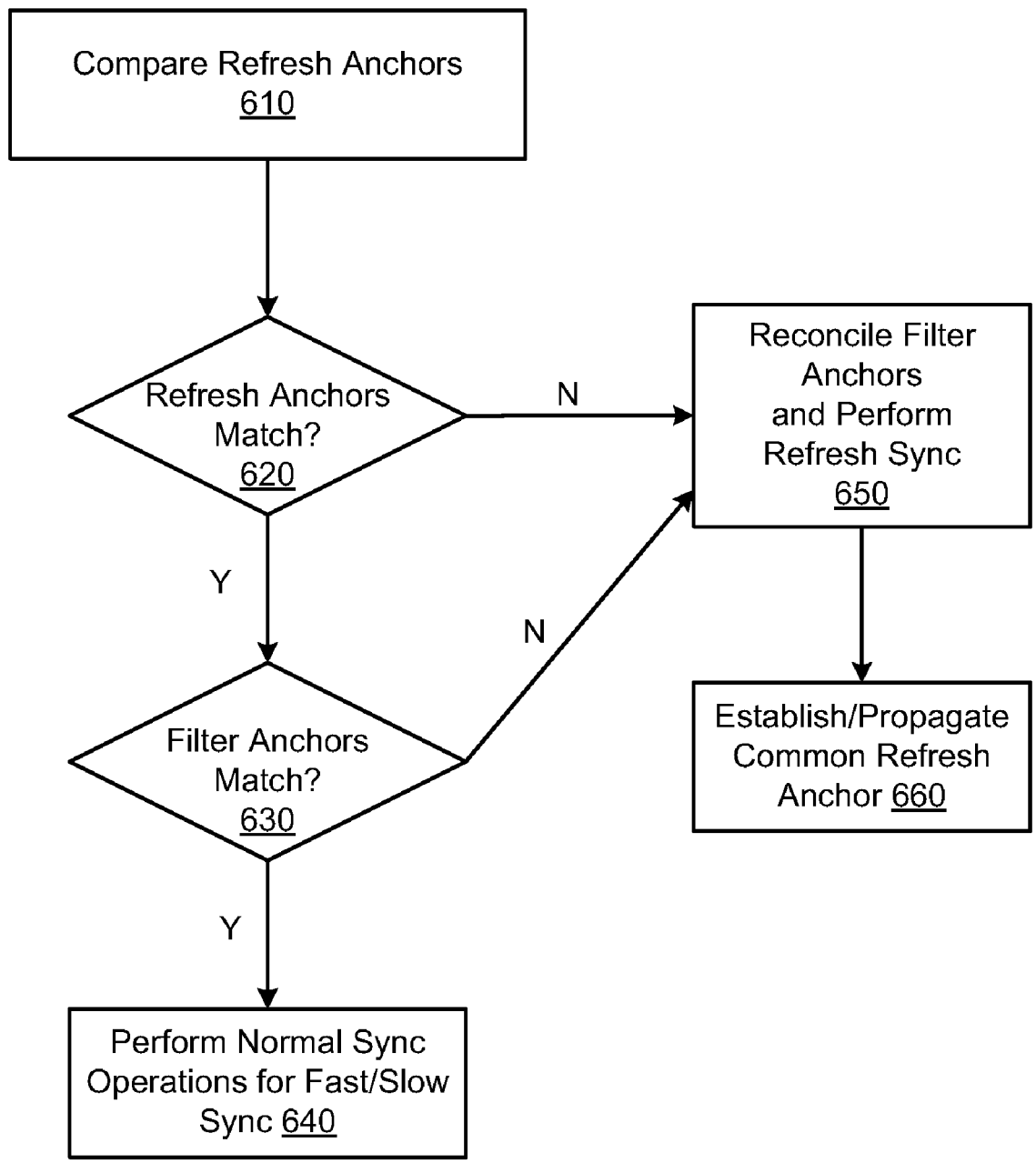
FIG. 6 is a flow diagram illustrating a synchronization process according to various embodiments.

FIG. 6 is a flow diagram illustrating a synchronization process according to various embodiments. When a device and a computer initiate a synchronization attempt, refresh anchors are exchanged and compared 610. It is determined whether the refresh anchors match 620. If the refresh anchors do not match, an additive refresh synchronization is performed and the filter anchors are reconciled 650. In embodiments where the device adopts the computer's filter anchors, the refresh synchronization may be performed before the filter settings are changed on the device. In embodiments where the computer adopts the device's filter anchors, the synchronization may be performed after the filter settings have been changed on the computer. Other combinations and/or orderings can be used in other embodiments. If the sync is successful, a new common refresh anchor is established/propagated between the device and the computer 660.

If it is determined at step 620 that the refresh anchors are matching, it is further determined whether filter anchors on the device and the computer are matching 630. In some embodiments, refresh anchors may be used without filter anchors, rendering step 630 unnecessary. If the filter anchors do not match, then a refresh synchronization is performed 650. If the filter anchors do match, then normal synchronization operations (e.g., the operations illustrated in FIG. 5) may be performed 640.

In various embodiments, after the synchronization has been performed, if the device introduced new contact groups which it had not previously been syncing, and if filtering is enabled on the computer, then the computer will add the new contact groups from the device into the filter set, and it will need to update the filter anchors on the computer and device. A similar process might apply to adding new calendars in various embodiments.

Figure 7:
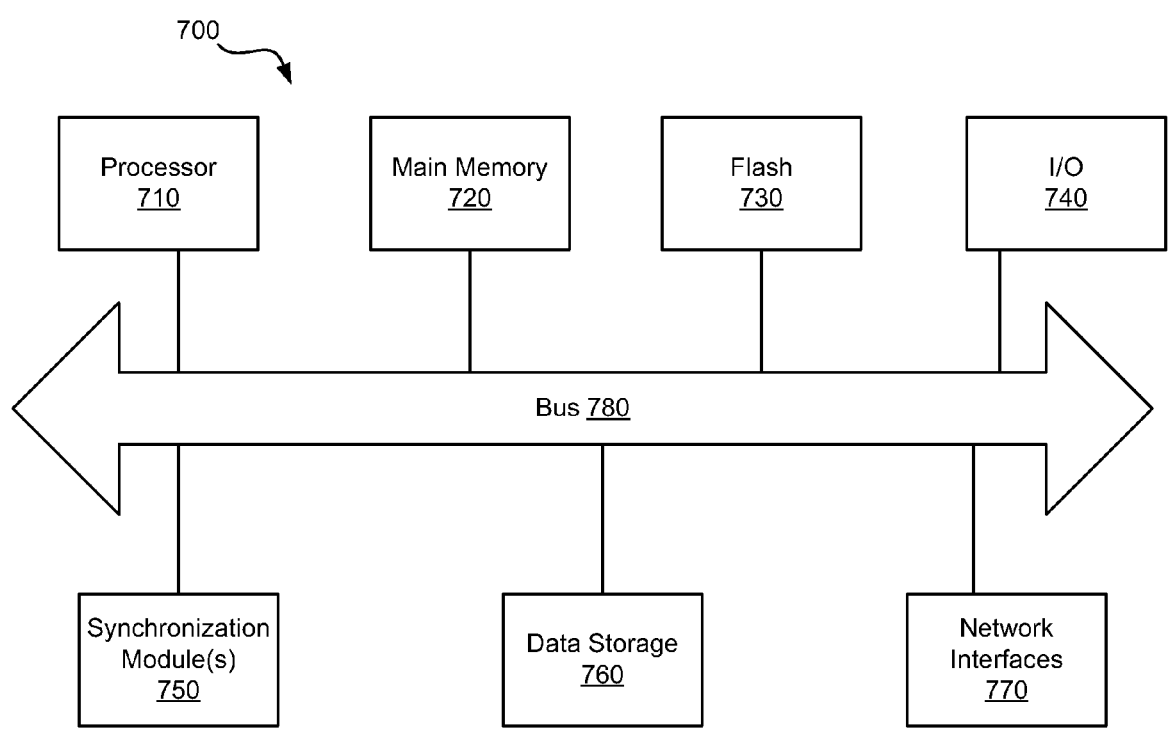
FIG. 7 is a block diagram illustrating a suitable computing environment for practicing various embodiments described herein.

FIG. 7 is a block diagram illustrating a suitable computing environment for practicing various embodiments described herein. Collectively, these components are intended to represent a broad category of hardware systems, including but not limited to general purpose computer systems and specialized handheld computer devices.

Computer system 700 includes processor 710, I/O devices 740, main memory 720 and flash memory 730 coupled to each other via a bus 780. Main memory 720, which can include one or more of system memory (RAM), and nonvolatile storage devices (e.g., magnetic or optical disks), stores instructions and data for use by processor 710. Additionally, the network interfaces 770, data storage 760, and synchronization module(s) 750 are coupled to each other via a bus 780. Data storage 760 stores the structured data (e.g., contact information, calendars, etc.) described herein.

The various components of computer system 700 may be rearranged in various embodiments, and some embodiments may not require nor include all of the above components. Furthermore, additional components may be included in system 700, such as additional processors (e.g., a digital signal processor), storage devices, memories, network/communication interfaces, etc.

In the illustrated embodiment of FIG. 7, methods and apparatuses for providing synchronization between multiple computers according to the present invention as discussed above may be implemented as a series of software routines run by computer system 700 of FIG. 7. These software routines comprise a plurality or series of instructions to be executed by a processing system in a hardware system, such as processor 710. Initially, the series of instructions are stored on a data storage device 760, memory 720 or flash 730.

Various components described herein may be a means for performing the functions described herein. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a computer readable medium, which provides content that represents instructions that can be executed. The content may result in a computer performing various functions/operations described herein. A computer readable (or machine readable or electronically accessible) medium includes any mechanism that provides (i.e., stores and/or transmits) information in a form accessible by a computing device (e.g., computer, PDA, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or the like. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method, comprising:
synchronizing structured data in a first store on a device with structured data in a second store on a first host if the device and the first host have a matching refresh anchor;
performing additive synchronization of structured data in the first store on the device with structured data in the second store on the first host if the device and the first host have different refresh anchors, wherein additive synchronization combines structured data from the first store on the device with structured data in the second store on the first host without deleting structured data from the first store or the second store.

2. The method of claim 1, wherein the structured data is one or more of calendar data, contact information, email account setup information, bookmarks, notes, task lists, music files, or documents.

3. The method of claim 1, wherein performing additive synchronization further comprises:
generating a common refresh anchor for the device and the first host.

4. The method of claim 3, further comprising:
- determining that the common refresh anchor for the device and the first host does not match a refresh anchor of a second host;
- performing additive synchronization of structured data in the first store on the device with structured data in a third store on a second host, wherein the common refresh anchor is propagated to the second host.

5. The method of claim 1, further comprising:
- performing additive synchronization of structured data in the first store on the device with structured data in the second store on the first host if the device and the first host have a matching refresh anchor but structured data filter settings associated with the device are different than structured data filter settings associated with the first host; and
- reconciling the structured data filter settings between the device and the first host.

6. The method of claim 5, wherein reconciling the structured data filter settings comprises one of:
- automatically imposing the filter settings of the first host onto the device;
- automatically imposing the filter settings of the device onto the first host; and
- applying filter settings selected by a user on the device and the first host.

7. An article of manufacture, comprising a computer readable medium having content stored thereon to provide instructions to result in an electronic device performing operations including:
- synchronizing structured data in a first store on a device with structured data in a second store on a first host if the device and the first host have a matching refresh anchor;
- performing additive synchronization of structured data in the first store on the device with structured data in the second store on the first host if the device and the first host have different refresh anchors, wherein additive synchronization combines structured data from the first store on the device with structured data in the second store on the first host without deleting structured data from the first store or the second store.

8. The article of manufacture of claim 7, wherein the structured data is one or more of calendar data, contact information, email account setup information, bookmarks, notes, task lists, music files, or documents.

9. The article of manufacture of claim 7, wherein the content to provide instructions that cause the electronic device to perform additive synchronization comprises further content to cause the electronic device to perform operations including:
- generating a common refresh anchor for the device and the first host.

10. The article of manufacture of claim 9, further comprising further content to provide instructions that cause the electronic device to perform operations including:
- determining that the common refresh anchor for the device and the first host does not match a refresh anchor of a second host;
- performing additive synchronization of structured data in the first store on the device with structured data in a third store on a second host, wherein the common refresh anchor is propagated to the second host.

11. The article of manufacture of claim 7, further comprising further content to provide instructions that cause the electronic device to perform operations including:
- performing additive synchronization of structured data in the first store on the device with structured data in the second store on the first host if the device and the first host have a matching refresh anchor but structured data filter settings associated with the device are different than structured data filter settings associated with the first host; and
- reconciling the structured data filter settings between the device and the first host.

12. The article of manufacture of claim 11, wherein reconciling the structured data filter settings comprises one of:
- automatically imposing the filter settings of the first host onto the device;
- automatically imposing the filter settings of the device onto the first host; and
- applying filter settings selected by a user on the device and the first host.

13. A device, comprising:
- means for synchronizing structured data in a first store on the device with structured data in a second store on a first host if the device and the first host have a matching refresh anchor;
- means for performing additive synchronization of structured data in the first store on the device with structured data in the second store on the first host if the device and the first host have different refresh anchors, wherein additive synchronization combines structured data from the first store on the device with structured data in the second store on the first host without deleting structured data from the first store or the second store.

14. The device of claim 13, wherein the structured data is one or more of calendar data, contact information, email account setup information, bookmarks, notes, task lists, music files, or documents.

15. The device of claim 13, wherein the means for performing additive synchronization further comprises:
- means for generating a common refresh anchor for the device and the first host.

16. The device of claim 15, further comprising:
- means for determining that the common refresh anchor for the device and the first host does not match a refresh anchor of a second host;
- means for performing additive synchronization of structured data in the first store on the device with structured data in a third store on a second host, wherein the common refresh anchor is propagated to the second host.

17. The device of claim 13, further comprising:
- means for performing additive synchronization of structured data in the first store on the device with structured data in the second store on the first host if the device and the first host have a matching refresh anchor but structured data filter settings associated with the device are different than structured data filter settings associated with the first host; and
- means for reconciling the structured data filter settings between the device and the first host.

18. The device of claim 17, wherein the means for reconciling the structured data filter settings comprises one or more of:
- means for automatically imposing the filter settings of the first host onto the device;
- means for automatically imposing the filter settings of the device onto the first host; and
- means for applying filter settings selected by a user on the device and the first host.

* * * * *